(12) United States Patent
Tuvnes et al.

(10) Patent No.: US 9,956,507 B2
(45) Date of Patent: May 1, 2018

(54) INLINE GAS LIQUID SEPARATION SYSTEM WITH A SHARED REJECT VESSEL

(71) Applicant: FMC Kongsberg Subsea AS, Kongsberg (NO)

(72) Inventors: Henrik Johan Tuvnes, Slependen (NO); René Mikkelsen, Pavuna-Rio de Janeiro (BR); Haakon Ellingsen, Oslo (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 690 days.

(21) Appl. No.: 14/404,000

(22) PCT Filed: May 24, 2013

(86) PCT No.: PCT/EP2013/060754
§ 371 (c)(1),
(2) Date: Nov. 25, 2014

(87) PCT Pub. No.: WO2013/174985
PCT Pub. Date: Nov. 28, 2013

(65) Prior Publication Data
US 2015/0306522 A1    Oct. 29, 2015

(30) Foreign Application Priority Data

May 25, 2012 (NO) .................................. 20120622

(51) Int. Cl.
| | | |
|---|---|---|
| *B01D 19/00* | (2006.01) | |
| *E21B 43/34* | (2006.01) | |
| *E21B 43/36* | (2006.01) | |
| *B01D 17/02* | (2006.01) | |
| *B01D 17/04* | (2006.01) | |
| *B01D 17/00* | (2006.01) | |
| *B01D 45/16* | (2006.01) | |

(52) U.S. Cl.
CPC .......... *B01D 19/0052* (2013.01); *B01D 17/00* (2013.01); *B01D 17/0214* (2013.01); *B01D 17/0217* (2013.01); *B01D 17/044* (2013.01); *B01D 19/0063* (2013.01); *B01D 19/0068* (2013.01); *B01D 45/16* (2013.01); *E21B 43/34* (2013.01); *E21B 43/36* (2013.01)

(58) Field of Classification Search
None
See application file for complete search history.

(56) References Cited

U.S. PATENT DOCUMENTS

| | | | |
|---|---|---|---|
| 4,708,793 A | 11/1987 | Cathriner et al. | |
| 8,657,940 B2 * | 2/2014 | Aarebrot ............ | B01D 17/0214 55/447 |

FOREIGN PATENT DOCUMENTS

| | | |
|---|---|---|
| EP | 0 082 630 A1 | 6/1983 |
| EP | 1 352 679 A1 | 10/2003 |
| EP | 2 263 767 A1 | 12/2010 |

(Continued)

OTHER PUBLICATIONS

OTC 23223, Paper prepared for presentation at the Offshore Technology Conference held in Houston, Tex., USA, Apr. 30-May 3, 2012, accessed Dec. 5, 2017 (Year: 2012).*

*Primary Examiner* — Amber R Orlando
*Assistant Examiner* — Phillip Y Shao

(57) ABSTRACT

The present invention concerns a gas-liquid separation system and a method for operating a gas-liquid separation system.

12 Claims, 2 Drawing Sheets

(56) References Cited

FOREIGN PATENT DOCUMENTS

| WO | WO 00/40834 A1 | 7/2000 |
| WO | WO 2004/050566 A2 | 6/2004 |
| WO | WO 2004/080565 A1 | 9/2004 |
| WO | WO 2009/108063 A1 | 9/2009 |

* cited by examiner

INLINE GAS LIQUID SEPARATION SYSTEM WITH A SHARED REJECT VESSEL

FIELD OF INVENTION

The present invention is concerned with a system for gas-liquid separation wherein rejection streams of degasser and deliquidizer units are combined in a shared reject vessel.

BACKGROUND OF INVENTION

Gas-liquid separation equipment and systems have a long range of industrial applicability including the oil and gas industry. Subsea separation, including deep-water subsea separation, involves particular challenges with respect to weight and size of the equipment to be used.

The weight and size limitations involve challenges with compact separation systems, because the systems have to be compact with low weight. Additionally the systems should be robust, i.e. have reduced need for maintenance. The system must however be accessible for intervention.

A separation process design should be robust such that the separation process can be operated safely and reliably with respect to specifications, and also the quality of the gas and liquid outlets should be delivered in accordance with specifications. A simple and robust process design also enables conventional and robust process control configurations.

If the gas and liquid outlets are not within the quality specifications, downstream equipment such as pumps and compressors may be damaged.

The inlet flow may be uncertain and varying, both in amount and composition, and it is thus necessary that the system have good and easy turndown and start-up abilities as well as flexible operating ranges.

Operating in deep water, it is an advantage that the system can be classified and approved according to pipe code instead of pressure vessel.

Examples of multiphase separation systems are found in e.g. WO 00/40834 A1, GB 2 394 737 A and U.S. Pat. No. 6,197,095 B1.

WO 00/40834 A1 relates to a method for removing condensables from a natural gas stream at a wellhead downstream of the wellhead choke thereof. This publication discloses a method for removing condensables from a natural gas stream at a wellhead, the method comprising the steps of: (A) inducing the natural gas to flow at supersonic velocity through a conduit of a supersonic inertia separator and thereby causing the fluid to cool to a temperature that is below a temperature/pressure at which the condensables will begin to condense, thereby forming separate droplets and/or particles; (B) separating the droplets and/or particles from the gas; and (C) collecting the gas from which the condensables have been removed, wherein the supersonic inertia separator is part of the wellhead assembly downstream of the wellhead choke. WO 00/40834 A1 also discloses a device for removing said condensables from said natural gas that is part of the wellhead assembly downstream of the choke.

GB 2 394 737 A discloses a fluid separation system for separating a multiphase fluid from a well comprising at least one first gravity separator and at least one second gravity separator, and valves which allow the first and second gravity separators to be set in parallel or series formation depending on the properties of the fluid and process conditions. Valves can be selectively opened or closed to allow the first separators to operate in parallel formation followed by a secondary re-separation process through second separators which are also operated in parallel formation.

In U.S. Pat. No. 6,197,095 B1, a subsea multiphase fluid separation system and method are disclosed where the system is a modular construction and the modules are secured in a single frame to be lowered as a unit to the seabed. The system utilizes reliable cyclonic operation. The sequence of the process steps is designed to make the system more efficient as compared to surface separating systems and thereby permit a more compact size as is desirable for subsea operations. The method of operation includes up to five basic process steps, with the initial step in one embodiment including cyclonically separating solids. A second stage is directed to cyclonically removing bulk gas from the liquid in either a cyclone or auger separator. A liquid-liquid hydro-cyclone for the third stage acts to pre-separate the fluid either by separating and/or by coalescing oil droplets in a water continuous stream and/or water droplets in an oil continuous stream. A fourth stage gravity separator is significantly smaller for the flow throughput as compared to surface separating systems due to the earlier separation processes and due to the option of subsequent oil-water separation in a de-oiling liquid-liquid hydro-cyclone.

SUMMARY OF THE INVENTION

The invention is defined in the patent claims.

DETAILED DESCRIPTION OF THE INVENTION

The present invention is particularly advantageous in subsea application. Even if the invention is described herein by way of example with reference to such subsea application it should be understood that the invention is not limited to such subsea use but is also applicable for use both topside on an offshore installation as well as on land.

Figure 1:
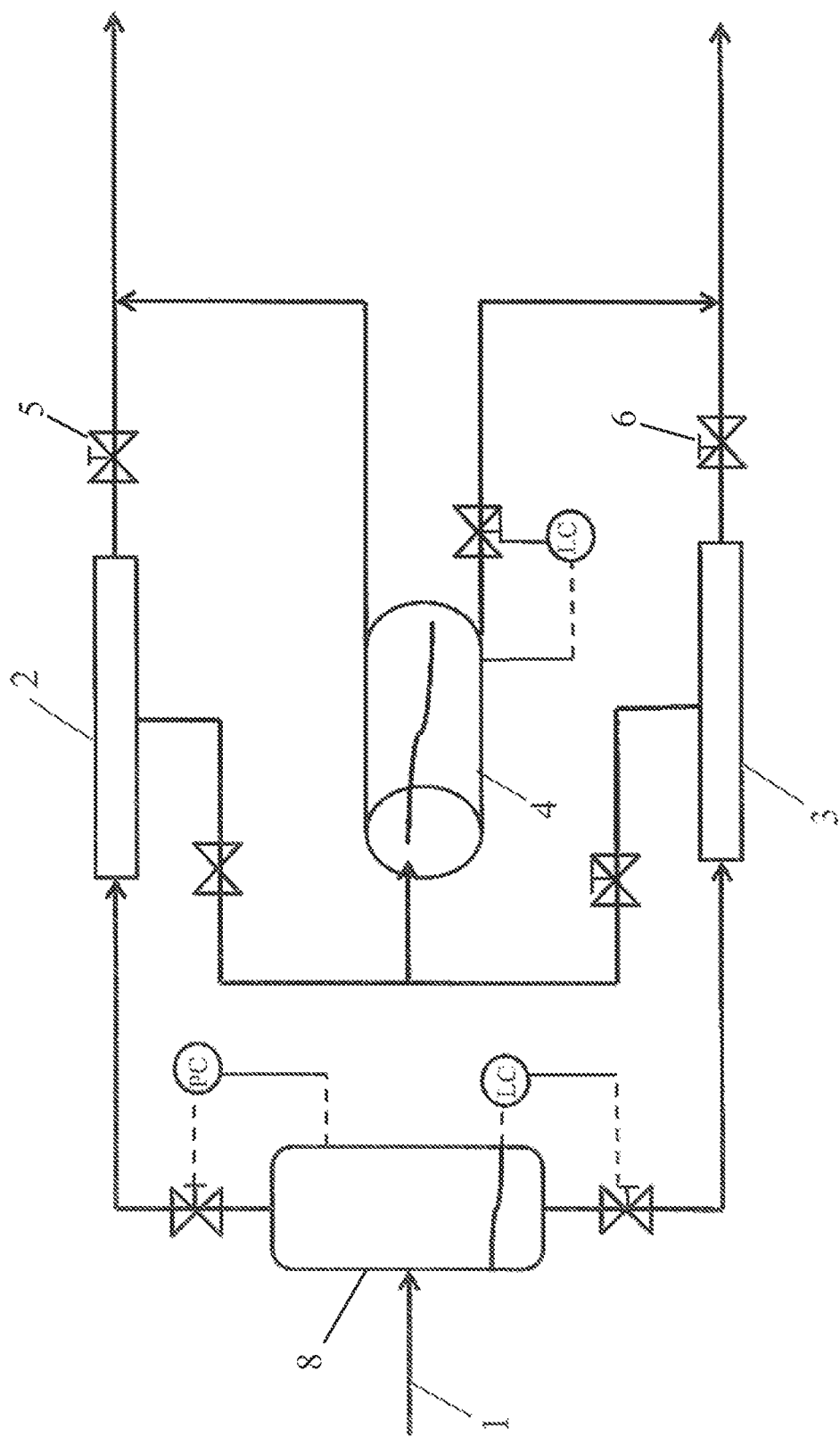
FIG. 1 shows an embodiment of the system according to the invention.

As shown in FIG. 1, the inlet stream 1 from the well stream is split into a gas continuous line and a liquid continuous line in, for instance, a phase splitter 8, such as a bulk separator, which can be either compact or conventional. The gas continuous stream is cleaned, i.e. de-liquidized, preferably in an inline deliquidizer 2, after which the clean gas exits through the gas exit and the reject stream enters the reject vessel 4. Similarly, the liquid continuous stream is de-gasified, preferably in an inline degasser 3, after which the clean liquid exits through the liquid exit and the reject stream enters the reject vessel 4.

The reject vessel 4 is then used to clean the remaining gas and liquid, and the resulting gas is combined with the gas outlet of the deliquidizer 2 while the resulting liquid is combined with the liquid outlet of the degasser 3.

Inline separators suffer inherently from low turndown abilities, as it is the inlet flow momentum that facilitates the centripetal acceleration (or g-force) driving the separation.

Turndown can be handled by having two or more deliquidizers and two or more degassers in parallel. In this way one can isolate, i.e. cut off, one or more of the units to handle turndown.

The system of the present embodiment handles very low turndown, i.e. 25% to 0% of the nominal designed flow rate, by closing the outlet valves 5 and 6 such that all of the inlet flow to the inline separators (the degasser and deliquidizer) are routed to the shared reject vessel 4. The flow rate is then low enough for the shared reject vessel 4 and first stage bulk separator 8 to separate and produce a clean gas and liquid stream without the use of the inline separators.

In this invention the degrading performance of inline separators during low flow rate can be overcome by using multiple degassers and deliquidizers in parallel and closing the outlet valves 5 and 6 during very low flow rates. When the outlet valves 5 and 6 are fully closed all of the flow is routed to the shared reject vessel 4.

The system is equipped with control valves which are used to regulate the flow rate of the different streams. These valves may be regulated independent of each other, although they should be regulated with regard to the flow rate and composition of the inlet stream 1.

The system can be controlled and regulated with means and methods generally known in the art.

This system design solution will ensure a complete and overlapping operational envelope and good separation quality and be within specification during start-up and shut-down and other abnormal operational scenarios where the flow rate is reduced, without the use/need of complex process control, recirculation or cross connecting process streams which tend to reduce the robustness and reliability of such compact separation systems.

The separation system design according to the invention provides a compact gas-liquid separation process. The solution is very attractive as a deep water subsea application, but also as a compact separation design for topside use.

The system design is particularly useful in combination with inline equipment. In this context inline equipment should be understood to mean equipment as described in OTC 23223, a paper prepared for presentation at the Offshore Technology Conference held in Houston, Tex., USA, 30 Apr.-3 May 2012, and SPE 135492, a paper prepared for presentation at the SPE Annual Technical conference and Exhibition held in Florence, Italy, 19-22 Sep. 2012. The use of such inline equipment is limited due to rigid system dynamics and susceptibility to flow variations. When using a single vessel for reject streams from both degasser and deliquidizer, the control complexity of the system is reduced and operating with a larger total reject stream is possible, thus increasing the robustness of the system.

Combining the reject streams of the inline separators into a combined reject vessel enables the total separation system to be semi-compact, use standard process control solutions, be tolerant to inlet flow and pressure variations, and still achieve good quality outlet streams.

The separation system design according to the invention is used in a compact gas-liquid separation process. It can be used deep water subsea, even ultra deep water (below 3000 meters) or as a high pressure topside application. The invention provides a low weight system with robust design with respect to process control, and can thus handle start-up and shut-down of the separation process. In certain embodiments of the invention the system can also be designed using pipe code classification.

Referring again to FIG. 1, the gas and liquid inlet stream 1 enters the splitter 8, which separates the stream into a liquid continuous stream and a gas continuous stream. The gas continuous stream flows to the deliquidizer 2, where the fluid is set into spin and the centripetal acceleration drives separation of the gas and liquid. Clean gas exits the deliquidizer 2 through the gas outlet, while the liquid extracted from the gas, together with a portion of the gas, is extracted in the reject line and flows into the reject vessel 4. The liquid continuous stream from the splitter 8 flows to the degasser 3, where the fluid is set into spin and the centripetal acceleration drives separation of the gas and liquid. Clean liquid exits the degasser 3 via the liquid outlet, while the gas and some liquid are extracted in the reject line and flow into the reject vessel 4. The mixed liquid and gas streams from the rejects for the deliquidizer 2 and the degasser 3 are separated by gravity in the shared reject vessel 4, after which the dry gas is combined with the gas outlet and the degassed liquid is combined with the liquid outlet.

Combining the rejects into a shared vessel 4 enables this separation system to produce two clean phases and at the same time makes this system more flexible to process disturbances and easier to control than using a deliquidizer and a degasser with separate boot and scrubber sections, respectively, both which would require separate control systems. The purpose of the deliquidizer 2 and degasser 3 is to reduce the gas and liquid load into the shared reject vessel 4 and thus enable an ultra compact size and footprint, and still achieve the specified gas and liquid outlet quality.

Utilizing a shared reject vessel 4, deliquidizer 2 and degasser 3 can be operated more conservatively compared to common design philosophy for inline equipment, meaning that slightly more reject than what is required to achieve the specified separation efficiency should be extracted to the reject line and into the shared reject vessel 4. This will ensure good tolerance to inlet flow and pressure disturbances.

In an embodiment of the invention, a gas-liquid separation system is provided comprising a splitter 8 configured to separate the inlet stream from a well stream into liquid and gaseous phases, and to drive separation of the gas and liquid, wherein the clean liquid exits through a liquid outlet pipeline and the gas with some liquid is extracted into a reject line and flows into a reject vessel 4, and wherein the splitter has an outlet for the gaseous phase to a gas continuous line which is connected to a deliquidizer configured to drive separation of liquid and gas, wherein the clean gas exits through a gas outlet pipeline and the liquid with some gas is extracted into a reject line and flows into the reject vessel.

In other embodiments of the invention the shared reject vessel is a conventional separator or an ID pipe section.

In a preferred embodiment of the invention the degasser is an inline degasser and/or the deliquidizer is an inline deliquidizer.

Figure 2:
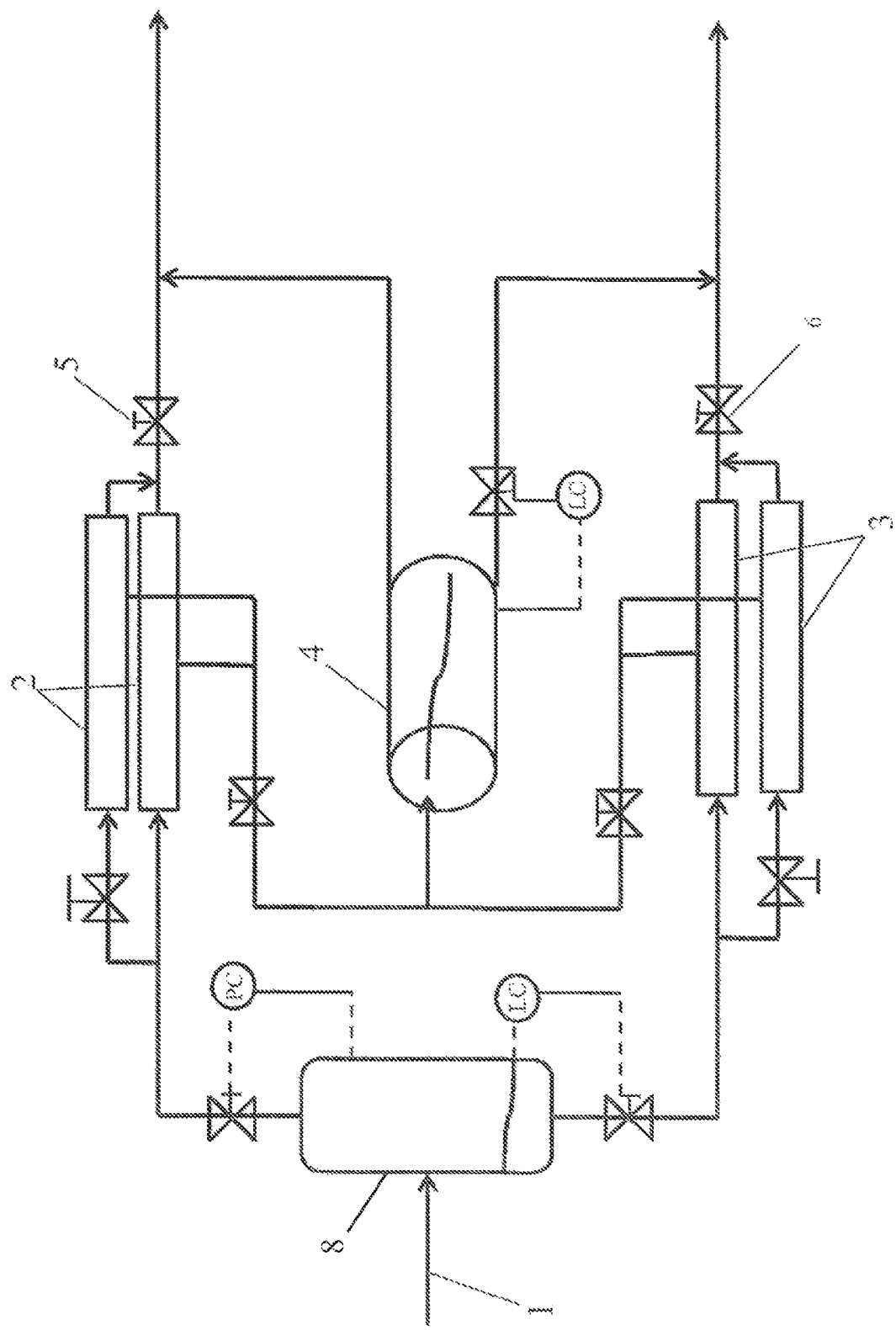
FIG. 2 shows an embodiment of the invention with multiple degassers 3 and deliquidizers 2 in parallel and wherein the reject streams enters a shared reject vessel 4.

In an embodiment of the invention the gas continuous stream flows into one or more deliquidizers 2, the liquid continuous stream flows into one or more degassers 3, and all the reject streams are combined in a shared reject vessel 4. In systems wherein there are two or more deliquidizers and/or two or more degassers, they are configured in parallel as illustrated in FIG. 2.

The number of degassers and deliquidizers are independent of each other, e.g. there may be one degasser and two or more deliquidizers in parallel, two or more degassers in parallel with one deliquidizer, three degassers in parallel and five deliquidizers in parallel.

The shared reject vessel 4 is in one embodiment of the invention configured to receive rejects from additional process units, particularly additional subsea process units, e.g. other subsea separators or liquid precipitates from compressors. In this embodiment the reject vessel comprises at least one connection to a stream from an additional process unit.

In an embodiment of the invention a system is provided wherein a gas outlet from the reject vessel is connected to the gas outlet from the deliquidizer. A system is further provided wherein a liquid outlet from the reject vessel is connected to the liquid outlet from the degasser.

The system according to the invention comprises control valves 5, 6. The flow rates through the control valves 5, 6 are regulated in accordance with the flow rate and composition of an inlet stream 1. The inlet flow will vary in both flow rate and composition, e.g. in the ratio between gaseous and liquid phases.

The invention also provides a method of operating a gas-liquid separation system, comprising transferring an inlet stream from a well stream to a splitter facilitating separation of a liquid phase and a gaseous phase, transferring the liquid continuous stream into the degasser where the fluid is set into spin and the centripetal acceleration drives separation of gas and liquid, the clean liquid exits through a liquid outlet and gas and some liquid are extracted in the reject line and flow into a reject vessel, transferring the gas continuous stream into the deliquidizer where the fluid is set into spin and the centripetal acceleration drives separation of liquid and gas, the clean gas exits through a gas outlet and liquid and some gas are extracted in the reject line and flow into the reject vessel, the mixed liquid and gas from the reject lines are separated by gravity in the shared reject vessel, the degassed liquid is combined with the liquid outlet and the dry gas is combined with the gas outlet.

In an embodiment of the method the stream flows are controlled by valves.

The invention claimed is:

1. A gas-liquid separation system comprising:
    a splitter which is configured to separate a well stream into liquid and gaseous phases;
    the splitter having an outlet for the liquid phase which is connected through a liquid continuous line to an inline degasser that is configured to drive separation of gas and liquid by centripetal acceleration, wherein clean liquid exits the degasser through a liquid outlet pipeline and gas with some liquid is extracted from the degasser into a reject line and flows into a reject vessel; and
    the splitter having an outlet for the gaseous phase which is connected through a gas continuous line to an inline deliquidizer that is configured to drive separation of liquid and gas by centripetal acceleration, wherein clean gas exits the deliquidizer through a gas outlet pipeline and liquid with some gas is extracted from the deliquidizer into a reject line and flows into the reject vessel.

2. The system according to claim 1, wherein the inline degasser comprises two or more inline degassers in parallel and/or the inline deliquidizer comprises two or more inline deliquidizers in parallel.

3. The system according to claim 1, wherein the reject vessel comprises a conventional separator.

4. The system according to claim 1, wherein the reject vessel comprises an ID pipe section.

5. The system according to claim 1, wherein the reject vessel comprises a connection to a stream from a process unit.

6. The system according to claim 1, wherein a gas outlet from the reject vessel is connected to the gas outlet pipeline from the deliquidizer.

7. The system according to claim 6, wherein a liquid outlet from the reject vessel is connected to the liquid outlet pipeline from the degasser.

8. The system according to claim 1, further comprising a number of control valves for controlling flow through at least one of the gas outlet pipeline and the liquid outlet pipeline.

9. The system according to claim 8, wherein the control valves are configured to be regulated in accordance with the a flow rate and composition of the well stream.

10. A method of operating a gas-liquid separation system, the gas-liquid separation system comprising a splitter which is configured to separate a well stream into liquid and gaseous phases; the splitter having an outlet for the liquid phase which is connected through a liquid continuous line to an inline degasser that is configured to drive separation of gas and liquid by centripetal acceleration, wherein clean liquid exits the degasser through a liquid outlet pipeline and gas with some liquid is extracted from the degasser into a first reject line and flows into a reject vessel; and the splitter having an outlet for the gaseous phase which is connected through a gas continuous line to an inline deliquidizer that is configured to drive separation of liquid and gas by centripetal acceleration, wherein clean gas exits the deliquidizer through a gas outlet pipeline and liquid with some gas is extracted from the deliquidizer into a second reject line and flows into the reject vessel; the method comprising:
    transferring an inlet well stream to the splitter;
    separating the well stream into a liquid phase and a gaseous phase in the splitter;
    transferring a liquid continuous stream from the splitter into the degasser, wherein the liquid continuous stream is set into spin and centripetal acceleration drives separation of gas and liquid, and wherein clean liquid exits the degasser through the liquid outlet pipeline and gas and some liquid are extracted from the degasser into the first reject line and flow into the reject vessel;
    transferring a gas continuous stream from the splitter into the deliquidizer, wherein the gas continuous stream is set into spin and centripetal acceleration drives separation of liquid and gas, and wherein clean gas exits the deliquidizer through the gas outlet pipeline and liquid and some gas are extracted from the deliquidizer into the second reject line and flow into the reject vessel;
    wherein mixed liquid and gas from the first and second reject lines are separated by gravity in the shared reject vessel; and
    wherein degassed liquid from the reject vessel is combined with clean liquid from the degasser in the liquid outlet pipeline and dry gas from the reject vessel is combined with clean gas from the deliquidizer in the gas outlet pipeline.

11. The method according to claim 10, further comprising controlling flow through at least one of the gas outlet pipeline and the liquid outlet pipeline using a number of valves.

12. The system according to claim 1, wherein the reject vessel is configured to separate the gas and liquid by gravity.

* * * * *